United States Patent
Yonemaru et al.

(10) Patent No.: US 8,730,228 B2
(45) Date of Patent: May 20, 2014

(54) DRIVING CIRCUIT FOR LIGHT EMITTING DIODE

(75) Inventors: Masao Yonemaru, Kyoto (JP); Naoki Inoue, Kyoto (JP); Hiroyuki Ishikawa, Kyoto (JP)

(73) Assignee: Rohm Co., Ltd. (JP)

( * ) Notice: Subject to any disclaimer, the term of this patent is extended or adjusted under 35 U.S.C. 154(b) by 953 days.

(21) Appl. No.: 12/783,056

(22) Filed: May 19, 2010

(65) Prior Publication Data

US 2011/0128303 A1 Jun. 2, 2011

(30) Foreign Application Priority Data

May 19, 2009 (JP) ................................. 2009-120904
May 22, 2009 (JP) ................................. 2009-123845
Mar. 24, 2010 (JP) ................................. 2010-068475

(51) Int. Cl.
*G06F 3/038* (2013.01)
*H05B 33/08* (2006.01)

(52) U.S. Cl.
CPC ........ *H05B 33/0818* (2013.01); *H05B 33/0827* (2013.01); *H05B 33/0887* (2013.01); *Y02B 20/341* (2013.01); *Y02B 20/347* (2013.01)
USPC ....................................................... 345/212

(58) Field of Classification Search
CPC ........... H05B 33/0818; H05B 33/0827; H05B 33/0887; Y02B 20/341; Y02B 20/347
USPC ......... 345/102, 211, 212; 363/21.18; 315/219
See application file for complete search history.

(56) References Cited

U.S. PATENT DOCUMENTS

| | | | |
|---|---|---|---|
| 7,675,245 B2 * | 3/2010 | Szczeszynski et al. | 315/291 |
| 8,120,283 B2 * | 2/2012 | Tanaka et al. | 315/307 |
| 2008/0238862 A1 * | 10/2008 | Kobori | 345/102 |
| 2009/0051629 A1 * | 2/2009 | Price et al. | 345/82 |
| 2009/0295776 A1 * | 12/2009 | Yu et al. | 345/212 |
| 2010/0019692 A1 * | 1/2010 | Kimura | 315/294 |

FOREIGN PATENT DOCUMENTS

| | | |
|---|---|---|
| CN | 1770227 A | 5/2006 |
| JP | 1-69382 U | 5/1989 |
| JP | 7-303373 A | 11/1995 |
| JP | 2002-252971 A | 9/2002 |
| JP | 2004-32875 A | 1/2004 |
| JP | 2007-28784 A | 2/2007 |
| JP | 2007-173813 A | 7/2007 |

(Continued)

OTHER PUBLICATIONS

The First Office Action for Chinese Patent Application No. 201010179584.5, issued Oct. 12, 2013, with English translation.

(Continued)

*Primary Examiner* — Pegeman Karimi
(74) *Attorney, Agent, or Firm* — Cantor Colburn LLP (57) ABSTRACT

A pulse modulator generates a first pulse signal having a duty ratio which is adjusted such that a detection voltage which indicates the electrical state of an LED string to be driven matches a predetermined reference voltage. A first pulse signal is applied to a primary coil of a pulse transformer. A DC/DC converter includes a switching element the ON/OFF operation of which is controlled according to a signal that originates at a secondary coil of the pulse transformer. The DC/DC converter stabilizes an input voltage Vdc, and supplies the input voltage Vdc thus stabilized to the anode of the LED string.

8 Claims, 7 Drawing Sheets

(56) References Cited

FOREIGN PATENT DOCUMENTS

| | | |
|---|---|---|
| JP | 2007-234414 A | 9/2007 |
| JP | 2008-96902 A | 4/2008 |
| JP | 2008-136293 A | 6/2008 |
| JP | 2009-32669 A | 2/2009 |
| JP | 2009-54998 A | 3/2009 |
| JP | 2010-35270 A | 2/2010 |
| WO | 2007/060941 A1 | 5/2007 |
| WO | 2008086050 A2 | 7/2008 |

OTHER PUBLICATIONS

Japanese Office Action, Notification of Reason(s) for Refusal for Application 2010-068475; date of mailing Mar. 25, 2014 with English translation.

* cited by examiner

DRIVING CIRCUIT FOR LIGHT EMITTING DIODE

BACKGROUND OF THE INVENTION

1. Field of the Invention

The present invention relates to a driving technique for a light emitting diode.

2. Description of the Related Art

As a backlight for a liquid crystal panel, white light emitting diodes (which will be simply referred to as "LEDs" hereafter) having improved properties from the perspective of a long operating life, low power consumption, and a wide color range are employed instead of conventional CCFLs (Cold Cathode Fluorescent Lamps) or EEFLs (External Electrode Fluorescent Lamps).

RELATED ART DOCUMENTS

Patent Documents

[Patent Document 1]
Japanese Patent Application Laid Open No. 2004-32875
[Patent Document 2]
Japanese Patent Application Laid Open No. 2002-252971
[Patent Document 3]
Japanese Patent Application Laid Open No. 2007-028784
[Patent Document 4]
Japanese Patent Application Laid Open No. 2007-173813
[Patent Document 5]
Japanese Patent Application Laid Open No. 2008-136293

Figure 1:
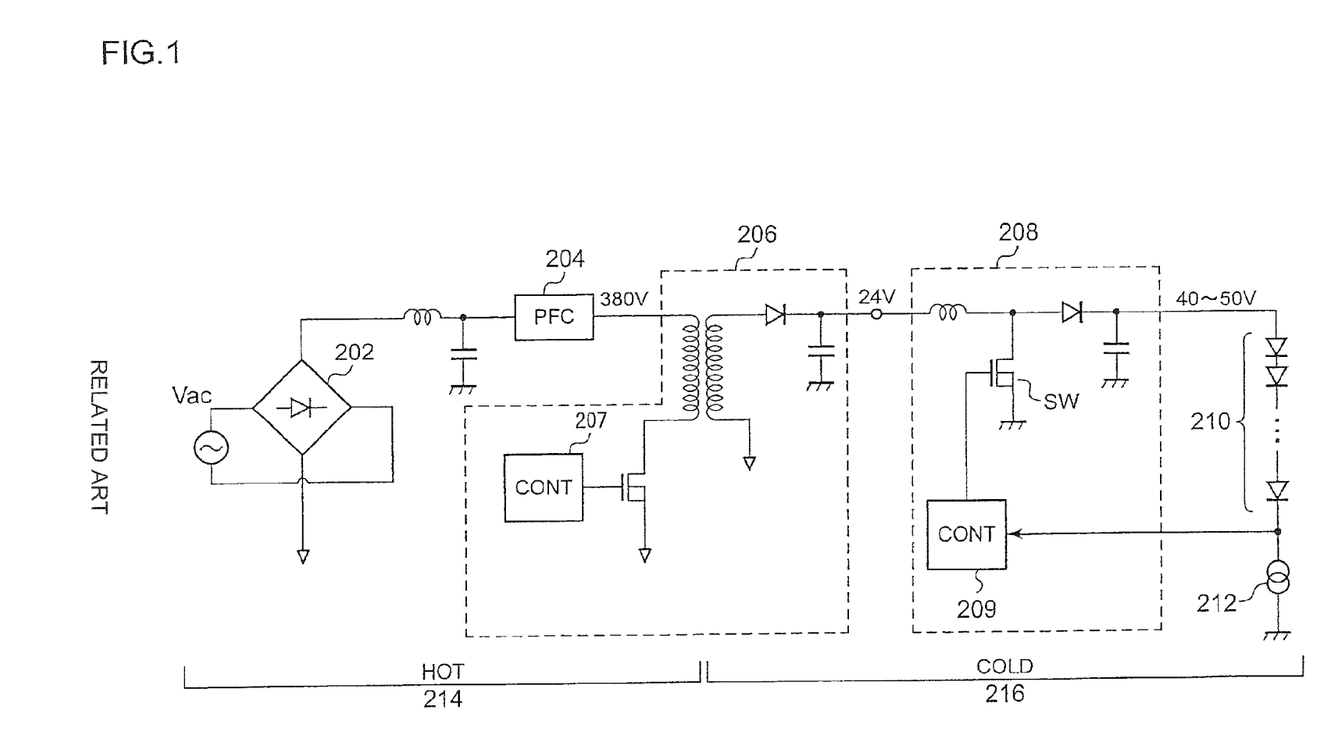
FIG. 1 is a block diagram which shows a configuration of a typical display apparatus.

FIG. 1 is a block diagram which shows a configuration of a typical display apparatus. A smoothing circuit 202 smoothes a commercial AC voltage (100 V). A power factor correction (PFC) circuit 204 is arranged to provide an improved power factor, thereby generating a DC voltage on the order of 380 V. A switching regulator (first DC/DC converter) 206 steps down the DC voltage of 380 V to 24 V. The voltage of 24 V thus generated is used as a power supply voltage for each block of the display apparatus.

Multiple strings 210, each of which is formed of multiple light emitting diodes (which will be referred to as "LEDs" hereafter) connected in series, are arranged on the back face of the liquid crystal panel. FIG. 1 shows only a single LED string 210. A second DC/DC converter 208 is a step-up switching regulator, which is configured to step up the DC voltage of 24 V so as to generate a driving voltage on the order of 40 to 50 V. The driving voltage thus generated is applied to the anode side of each LED string. A constant current driver 212 is arranged on the cathode side of each LED string 210, which supplies a driving current to the LED string 210 according to the light emission luminance value. A controller 209 for the second DC/DC converter 208 controls the duty ratio of the ON/OFF operation of a switching element SW such that the electrical state of the LED string 210 approaches the target value.

With the system shown in FIG. 1, in order to drive such LEDs, the commercial AC voltage is temporarily stepped down, following which the AC voltage thus stepped down is boosted. Such an arrangement requires two-step voltage conversion, leading to poor efficiency.

In electronic devices such as a display apparatus, there is a need to provide electrical isolation between a primary side region (hot region) 214 and a secondary side region (cold region) 216 in the power supply circuit. With the system shown in FIG. 1, the hot region HOT is isolated from the cold region COLD with the primary coil and the secondary coil of the first DC/DC converter as the boundary.

An arrangement in which a voltage of 380 V is converted into a voltage of 40 to 50 V in a single voltage conversion requires a feedback operation in which a detection signal which indicates the electrical state of the LED string 210 is fed back to the controller 207 for the first DC/DC converter 206. However, in such an arrangement, the feedback line straddles the hot region HOT and the cold region COLD, and thus violates the requirement of electrical isolation. An arrangement in which the feedback line includes a photo coupler or the like is capable of feeding back the detection signal to the controller 207 while maintaining electrical isolation. However, such an arrangement employing such a photo coupler has a problem of deterioration in the feedback precision.

SUMMARY OF THE INVENTION

1. The present invention has been made in view of such a situation. Accordingly, it is an exemplary purpose of the present invention to provide a driving circuit configured to drive an LED with high efficiency.

Furthermore, the inventor has investigated an LED driving circuit, and has come to recognize the following problems.

Figure 5:
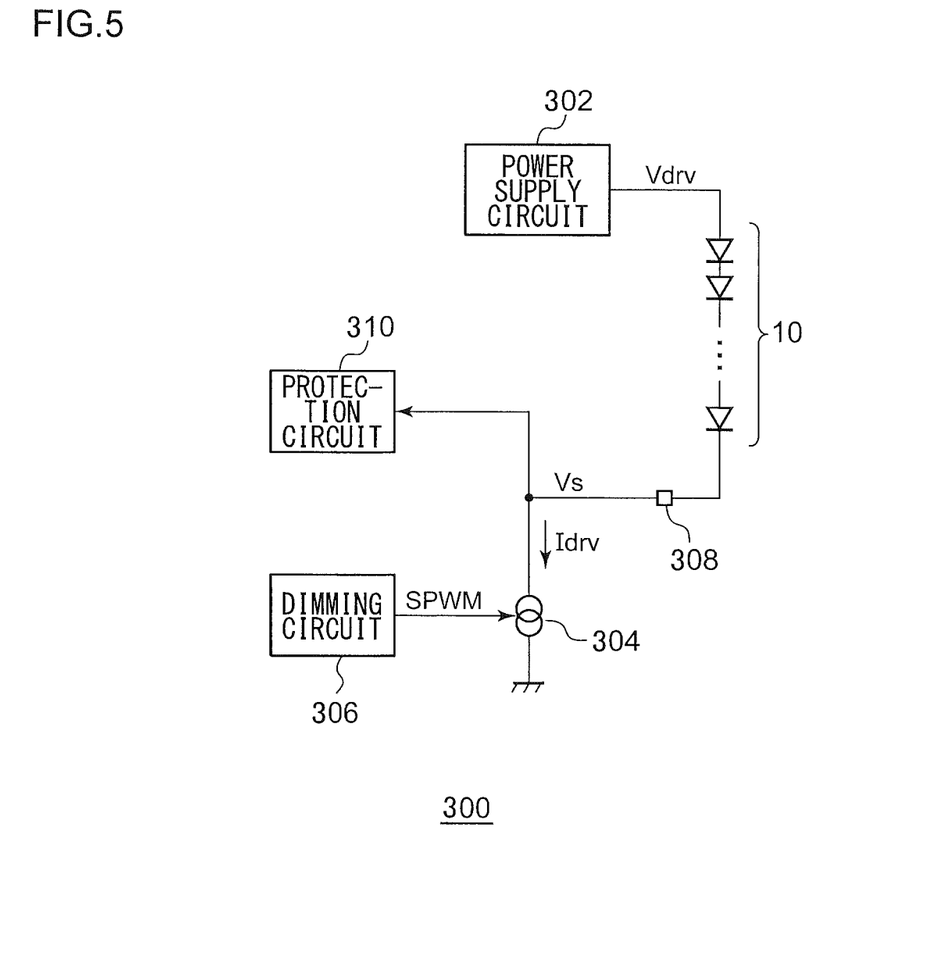
FIG. 5 is a circuit diagram which shows an example configuration of a typical LED driving circuit.

FIG. 5 is a circuit diagram which shows an example configuration of a typical LED driving circuit 300. The LED driving circuit 300 includes a power supply circuit 302, a current driver 304, a pulse modulation dimming circuit 306, an LED terminal 308, and a protection circuit 310. The LED terminal 308 is connected to a cathode terminal of an LED string including multiple LEDs to be driven. The power supply circuit 302 supplies a driving voltage Vdrv to an anode of the LED string 10.

The current driver 304 is connected to the LED terminal 308. The current driver 304 generates a driving current Idrv that corresponds to the luminance level for the LED string 10, and supplies the driving current Idrv thus generated to the LED string 10.

When the LED driving circuit 300 operates normally, the electric potential at the LED terminal 308 is stably maintained at around a predetermined voltage. However, whenever the LED string 10 enters the open state due to a malfunction thereof, or whenever the terminal on a driving path of the LEDs is short-circuited to the ground level or to the power supply voltage level (which will be referred to as an "abnormal state" hereafter), the electric potential at the LED terminal 308 (which will also be referred to as the "detection voltage Vs") changes from the electric potential which is set when the LED driving circuit 300 operates normally. The protection circuit 310 monitors the detection voltage Vs at the LED terminal 308 in order to detect abnormal states in the circuit. Whenever an abnormal state occurs, the protection circuit 310 performs predetermined protection processing.

In some cases, in order to control the luminance level of the LEDs (dimming operation), the driving current Idrv that flows through the LED string 10 is switched on and off (switching operation) with a duty ratio that corresponds to the luminance level. This operation will also be referred to as a "PWM driving operation". The PWM dimming circuit 306 controls the current driver 304 so as to perform a switching operation on the driving current Idrv according to a PWM signal SPWM.

With such an arrangement configured to perform a PWM control operation, the electric potential at the LED terminal 308 deviates from a predetermined range during a period in which the driving current Idrv is off, in the same way as it does in the abnormal state. Accordingly, with such an arrangement, the abnormal state cannot be distinguished from the normal state, leading to a difficulty in providing suitable circuit protection.

2. The present invention has been made in view of such a situation. Accordingly, it is an exemplary purpose of the present invention to provide a technique for detecting abnormal states in the PWM driving operation for the LEDs in a sure manner.

1. An embodiment of the present invention relates to a driving circuit for a light emitting diode. The driving circuit comprises: a pulse modulator configured to generate a first pulse signal the duty ratio of which is adjusted such that a detection voltage which indicates the electrical state of a light emitting diode to be driven matches a predetermined reference voltage; a pulse transformer including a primary coil and a secondary coil, and arranged such that the first pulse signal is applied to the primary coil; and a switching regulator including a switching element the ON/OFF operation of which is controlled according to a signal that originates at the secondary coil of the pulse transformer, and configured to stabilize an input voltage, and to output the input voltage thus stabilized to a first terminal of the light emitting diode.

With such an embodiment, the LED can be driven using a single DC/DC converter while maintaining the isolation between the hot region and the cold region.

A driving circuit according to an embodiment may further comprise a constant current circuit connected to a second terminal of the light emitting diode. Also, the pulse modulator may adjust the duty ratio of the first pulse signal such that the electric potential at the second terminal matches the predetermined voltage.

Also, the light emitting diode may be a backlight of a liquid crystal display. Also, the driving circuit may further comprise: a PLL circuit configured to receive a vertical synchronization signal output synchronously with the image data to be displayed on the liquid crystal display, and to multiply the vertical synchronization signal so as to generate a clock signal; and a duty ratio setting unit configured to count the clock signal so as to generate a pulse-modulated pulse modulation signal. Also, the constant current circuit may switch on and off a driving current that flows through the light emitting diode, according to the pulse modulation signal.

With such an arrangement, the LED can be PWM driven synchronously with the image data. Thus, the PWM frequency can be automatically changed without involving additional processing by means of a software component or a hardware component even if the frequency of the vertical synchronization signal changes.

Also, the driving circuit may further comprise: a smoothing circuit configured to smooth an AC voltage; and a power factor correction circuit configured to receive the voltage thus smoothed by the smoothing circuit, and to generate an input voltage of the switching regulator.

Another embodiment of the present invention relates to a light-emitting apparatus. The light-emitting apparatus comprises: a light emitting diode; and a driving circuit according to any one of the above-described embodiments, configured to drive the light emitting diode.

Yet another embodiment of the present invention relates to a display apparatus. The display apparatus comprises: a liquid crystal panel; and the above-described light-emitting apparatus arranged as a backlight mounted on a back face of the liquid crystal panel.

2. Another embodiment of the present invention relates to a driving circuit for a light emitting diode. The driving circuit comprises: a current driver arranged on a cathode side of a current path of the light emitting diode to be driven, and configured to generate a driving current; a pulse modulation dimming circuit configured to generate a pulse-modulated driving pulse, and to switch on and off the driving current according to the driving pulse thus generated; an abnormal state detection circuit configured to monitor the electric potential at the cathode terminal of the light emitting diode, and to generate an abnormal state detection signal which is asserted when an abnormal state is detected; and a timer circuit configured to start counting time when the driving pulse indicates ON and the abnormal state detection signal is asserted, and to generate a protection signal which is asserted whenever a predetermined period of time elapses before the abnormal state detection signal is negated. When the protection signal is asserted, the driving circuit executes predetermined protection processing.

With such an embodiment, when the driving current to be supplied to the light emitting diode is ON, and an abnormal state is detected, time counting is performed for the circuit protecting operation. Thus, such an arrangement is capable of distinguishing between the OFF state of the driving current and an abnormal state. Furthermore, such an arrangement continues counting time as for the continuing abnormal state, even if the PWM driving operation enters the OFF state when the abnormal state detection signal is asserted after time counting begins. Thus, such an arrangement is capable of detecting an abnormal state in a sure manner, independent of the duty ratio of the driving pulse.

The timer circuit comprises: a capacitor arranged such that the electric potential at one terminal is fixed; a charging circuit configured to charge the capacitor; a discharging circuit configured to discharge the capacitor; a flip-flop configured to be set when the driving pulse indicates ON and the abnormal state detection signal is asserted, and to be reset when the abnormal state detection signal is negated, and, when it is in the set state, to activate the charging circuit and deactivate the discharging circuit, and, when it is in the reset state, to deactivate the charging circuit and activate the discharging circuit; and a comparator configured to compare the electric potential at the other terminal of the capacitor with a predetermined threshold voltage, and to generate a protection signal having a level that corresponds to the comparison result.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C, via another member that does not affect the electric connection therebetween, in addition to a state in which the member A is directly connected to the member C, or the member B is directly connected to the member C.

First Embodiment

Figure 2:
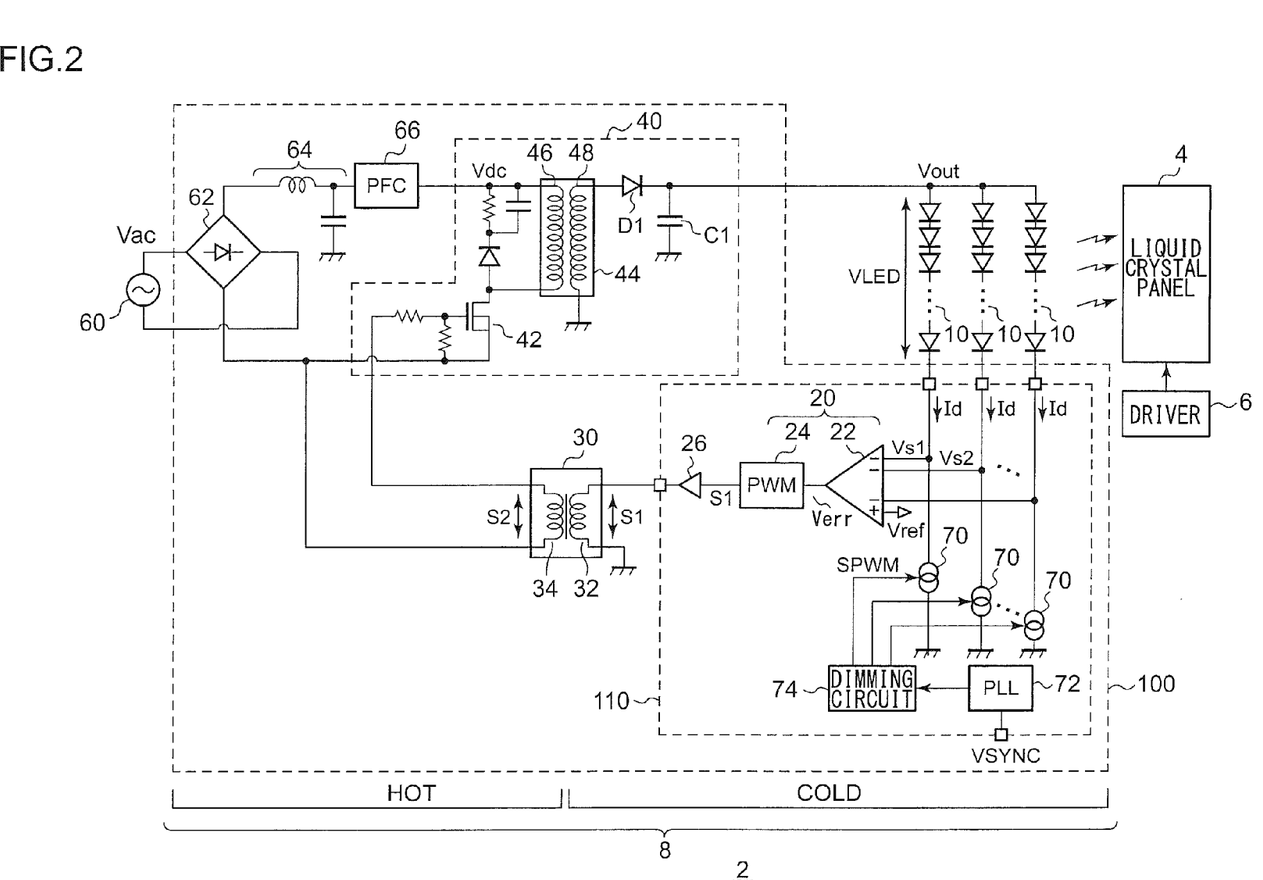
FIG. 2 is a circuit diagram which shows a configuration of a display apparatus according to a first embodiment.

FIG. 2 is a circuit diagram which shows a configuration of a display apparatus 2 according to a first embodiment. The display apparatus 2 includes a liquid crystal panel 4, a liquid crystal driver 6, and a backlight 8.

The liquid crystal panel 4 includes multiple pixels arranged in the form of a matrix. The respective pixels are arranged at the points of intersection of the multiple data lines and the multiple scanning lines. The liquid crystal driver 6 receives image data to be displayed on the liquid crystal panel 4. The liquid crystal driver 6 includes a data driver which applies a driving voltage to the multiple data lines according to the luminance level, and a gate driver which sequentially selects the multiple scanning lines.

The backlight 8 is arranged on the back face of the liquid crystal panel 4. The backlight 8 includes multiple LED strings 10 and a driving circuit 100 configured to drive the multiple LED strings 10. Each LED string 10 includes multiple LEDs connected in series.

The driving circuit 100 includes an LED driving IC 110, a pulse transformer 30, a DC/DC converter 40, a filter 64, and a PFC circuit 66.

The LED driving circuit 110 includes a pulse modulator 20, a buffer 26, multiple constant current circuits 70, a PLL circuit 72, and a dimming circuit 74, which are monolithically integrated on a single semiconductor substrate.

A constant current circuit 70 is arranged for each LED string 10. Specifically, each constant current circuit 70 is arranged between the cathode terminal of a corresponding LED string 10 and the ground terminal. The dimming circuit 74 adjusts the luminance level of each LED string 10 by controlling the current generated by the corresponding constant current circuit 70. Furthermore, the dimming circuit 74 drives each LED string 10 by PWM by performing a switching operation on the constant current circuit 70. The PWM driving operation will be described later.

The pulse modulator 20 generates a first pulse signal S1 based upon the detection voltage Vs which indicates the electrical state of the LED string 10. The pulse modulator 20 adjusts the duty ratio of the first pulse signal S1 such that the detection voltage Vs matches a predetermined reference voltage Vref. Examples of such an electrical state of the LED string 10 include the voltage at the cathode terminal of each LED string 10, and the voltage at the anode terminal thereof. FIG. 2 shows an arrangement in which the voltage at the cathode terminal, i.e., the voltage difference between both terminals of the constant current circuit 70 is used as the electrical state.

The pulse modulator 20 includes an error amplifier 22 and a pulse width modulator 24. The error amplifier 22 includes multiple inverting input terminals (−) and a single non-inverting input terminal (+). Each of the inverting input terminals (−) receives, as an input signal, a detection voltage Vs which indicates a corresponding single electrical state from among the states of the multiple LED strings 10. A predetermined reference voltage Vref is input to the non-inverting terminal (+) of the error amplifier 22. The error amplifier 22 amplifies the difference between the lowest detection voltage Vs and the predetermined reference voltage Vref, thereby generating an error voltage Verr. The pulse width modulator 24 generates the first pulse signal S1 the duty ratio of which changes according to the error voltage Verr. For example, the pulse width modulator 24 includes an oscillator which generates a cyclic voltage having a triangle waveform or a sawtooth waveform, and a comparator which slices the cyclic voltage using the difference voltage Verr. It should be noted that the configuration of the pulse modulator 20 is not restricted to such an arrangement shown in FIG. 2. Rather, various known techniques can be employed.

The pulse transformer 30 includes a primary coil 32 and a secondary coil 34. One terminal of the primary coil 32 is grounded. The first pulse signal S1 is applied to the other terminal thereof via the buffer 26. A second pulse signal S2 occurs at the secondary coil 34 according to the first pulse signal S1.

A commercial AC power supply 60 generates a 50 Hz or 60 Hz commercial AC voltage Vac. For example, a smoothing circuit 62 is a so-called diode bridge circuit, which rectifies the AC voltage Vac. The voltage thus smoothed is input to the DC/DC converter 40 via the PFC circuit 66.

The DC/DC converter 40 is a so-called switching regulator including a switching element 42, a transformer 44, a rectifier diode D1, and an output capacitor C1. The DC/DC converter 40 has a typical topology. A DC voltage on the order of 380 V (which will also be referred to as the "input voltage Vdc" hereafter) output from the PFC circuit 66 is input to one terminal of the primary coil 46 of the transformer 44. The switching element 42 is provided to the other terminal side of the primary coil 46 of the transformer 44. One terminal of the secondary coil 48 is grounded, and the other terminal thereof is connected to the anode of the rectifier diode D1. The output capacitor C1 is provided between the cathode of the rectifier diode D1 and the ground terminal.

The output voltage Vout of the DC/DC converter 40 is adjusted according to the duty ratio (ON/OFF time ratio) of the switching operation of the switching element 42. The output voltage Vout is applied to the anode of each LED string 10.

The secondary coil 34 of the pulse transformer 30 is connected between the gate and the source of the switching element 42. Thus, the ON/OFF operation of the switching element 42 is controlled according to the second pulse signal S2 that originates at the secondary coil 34 of the pulse transformer 30. That is to say, the switching element 42 performs a switching operation according to the first pulse signal S1.

The above is the configuration of the display apparatus 2. Next, description will be made regarding the operation of the backlight 8. When the user turns on the power supply for the display apparatus 2, a DC voltage Vdc is supplied to the DC/DC converter 40.

The DC/DC converter 40 performs a switching operation according to the second pulse signal S2. The driving current Id, which is generated by a corresponding constant current circuit 70, flows through each LED string 10. As a result, a voltage drop VLED occurs at each LED string 10.

The duty ratio of the first pulse signal S1 is adjusted such that the voltage at the cathode of the LED string 10 matches the reference voltage Vref. Accordingly, the output voltage Vout of the DC/DC converter 40 is stabilized such that it satisfies the Expression Vout=VLED+Vref.

The above is the operation of the backlight 8.

With the backlight 8 shown in FIG. 2, the cathode voltage of the LED string 10, i.e., the voltage difference between both terminals of the constant current circuit 70, can be adjusted so as to be the same as the reference voltage Vref. If the voltage between both terminals of the constant current circuit 70 becomes excessively low, in some cases, driving current Id having a desired magnitude cannot be generated, leading to a problem in that the LED string 10 cannot provide stable luminance. In contrast, the present embodiment ensures a sufficient voltage difference between both terminals of the constant current circuit 70, thereby generating a sufficient driving current Id in a sure manner.

It should be noted that the anode voltage can be employed as a feedback signal which indicates the electrical state of the LED string 10, instead of the cathode voltage. Such an arrangement provides somewhat inferior feedback efficiency as compared with the aforementioned arrangement in which the cathode voltage is monitored. However, such an arrangement is capable of driving the LEDs with high efficiency in the same way as in the configuration shown in FIG. 2.

With the circuit shown in FIG. 1, the driving voltage Vout is generated by means of two DC/DC converters. In contrast, the backlight 8 shown in FIG. 2 includes a single DC/DC converter 40. Thus, such an arrangement provides a jump in the improvement of electric power efficiency.

Furthermore, the hot region HOT and the cold region COLD are isolated by means of the transformer 44 and the pulse transformer 30. Thus, such an arrangement satisfies the requirement of isolation demanded in electronic products. The detection signal Vs which indicates the electrical state of the LED string 10 is converted in the cold region COLD into the first pulse signal S1, and the first pulse signal S1 thus converted is transmitted to the hot region HOT. With such an arrangement, the information with respect to the electrical state is carried on the pulse width of the first pulse signal S1. Thus, such an arrangement provides improved noise tolerance, thereby driving each LED string 10 in a sure manner.

Next, description will be made regarding the features of the PWM driving operation of the backlight 8 according to the embodiment.

In recent years, in cases in which LEDs are employed as a backlight, a technique has been introduced in which the luminance level of the backlight is locally changed according to the contrast of an image to be displayed on the liquid crystal panel (which is referred to as "area control" or "local dimming"), thereby providing an improved degree of contrast.

Such a local dimming operation is performed by independently controlling the multiple LED strings 10.

In a case in which the dimming operation for each LED string 10 is performed by means of the PWM driving operation, in some cases, the following problem occurs.

The liquid crystal panel displays an image based upon image data received from an external circuit and a synchronization signal appended to the image data. However, a typical LED driving circuit includes its own oscillator, which performs a PWM driving operation synchronously with a clock signal having a phase and frequency independent of the image data. With such an arrangement, the dimming operation for the backlight is performed asynchronously to the image data. Accordingly, such an arrangement does not provide an advantage of an improved degree of contrast. Furthermore, with such an arrangement, in a case in which the frequency (resolution) of the image data is changed, there is a need to provide a software-based change in the PWM driving frequency according to the change in the resolution of the image data.

The following features assist in solving such problems.

Figure 3:
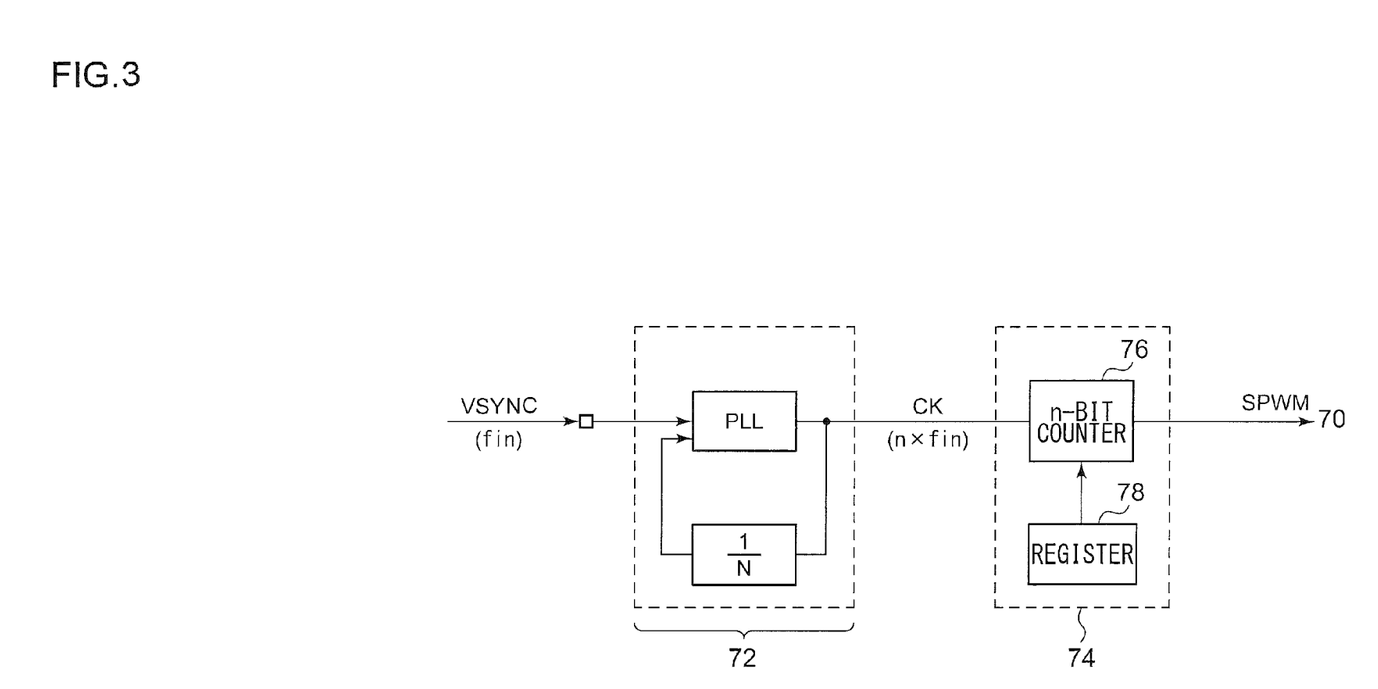
FIG. 3 is a circuit diagram which shows a part of the configuration of the LED driving circuit shown in FIG. 2.

FIG. 3 is a circuit diagram which shows a part of the configuration of the LED driving circuit 100 shown in FIG. 2. A PLL circuit 72 receives a vertical synchronization signal with a frequency fin, and multiplies the vertical synchronization signal by n, thereby generating a clock signal CK. The PLL circuit 72 includes a so-called phase comparator, a VCO (Voltage Controlled Oscillator), and a divider.

The clock signal CK is output synchronously with the vertical synchronization signal VSYNC, and the frequency thereof changes according to the vertical synchronization signal VSYNC.

A dimming circuit 74 is provided for each of the constant current circuits 70. Here, a single dimming circuit 74 is shown for simplicity of description. The dimming circuit 74 includes an n-bit counter 76 and a register 78. The register 78 stores a count value C1 that corresponds to the luminance level to be provided by the corresponding constant current circuit 70. The count value C1 is updated according to the image data to be displayed on the liquid crystal panel 4.

The n-bit counter 76 counts the clock signal CK, and generates a PWM signal SPWM having a duty ratio that corresponds to the count value C1 stored in the register 78.

Figure 4:
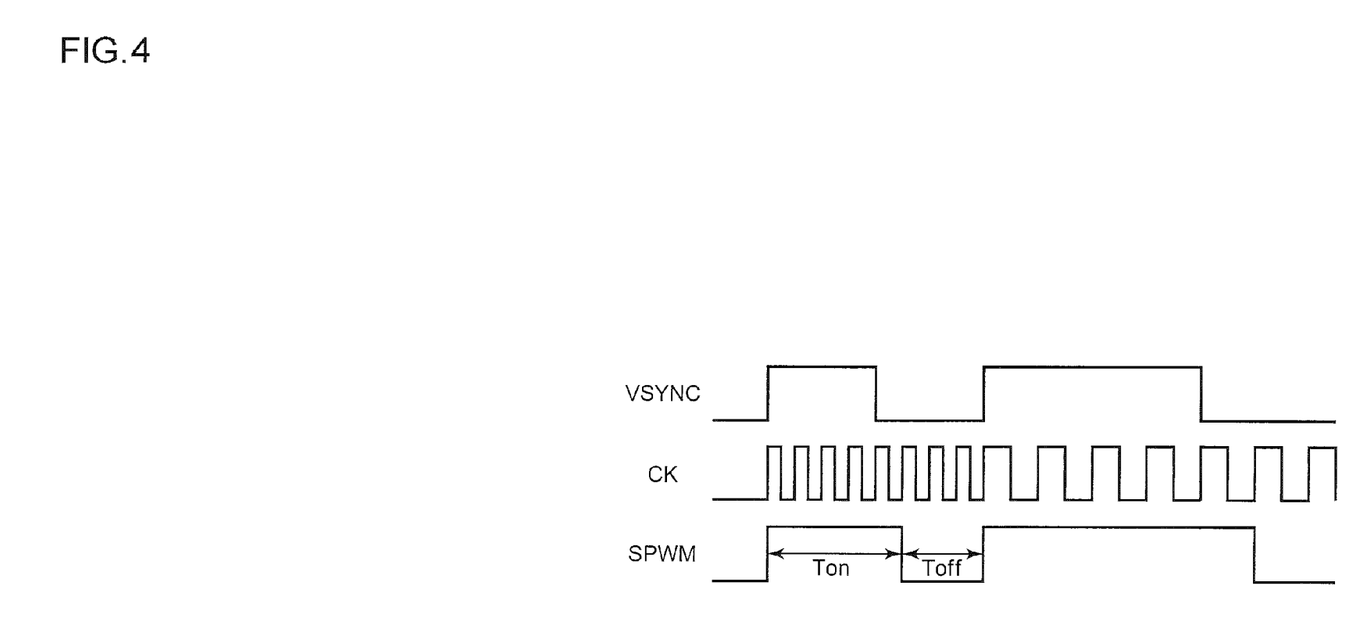
FIG. 4 is a time chart which shows an example of the PWM driving operation performed by the circuit shown in FIG. 3.

FIG. 4 is a time chart which shows an example of the PWM driving operation performed by the circuit shown in FIG. 3. The n-bit counter 76 starts to count at a timing of a positive edge of the vertical synchronization signal VSYNC, and counts the ON period Ton until the count value reaches the count value C1 stored in the register 78, after which the n-bit counter 76 counts the OFF period Toff until the next positive edge of the vertical synchronization signal VSYNC is detected. The time chart in FIG. 4 shows an arrangement in which n=8, and C1=5, for example.

With the dimming system shown in FIG. 3, the luminance level of the backlight can be adjusted synchronously with the image data. Furthermore, even in a case in which the resolution of the image data is changed, such a dimming system is capable of automatically adjusting the PWM driving frequency according to the change in the resolution of the image data.

Second Embodiment

Figure 6:
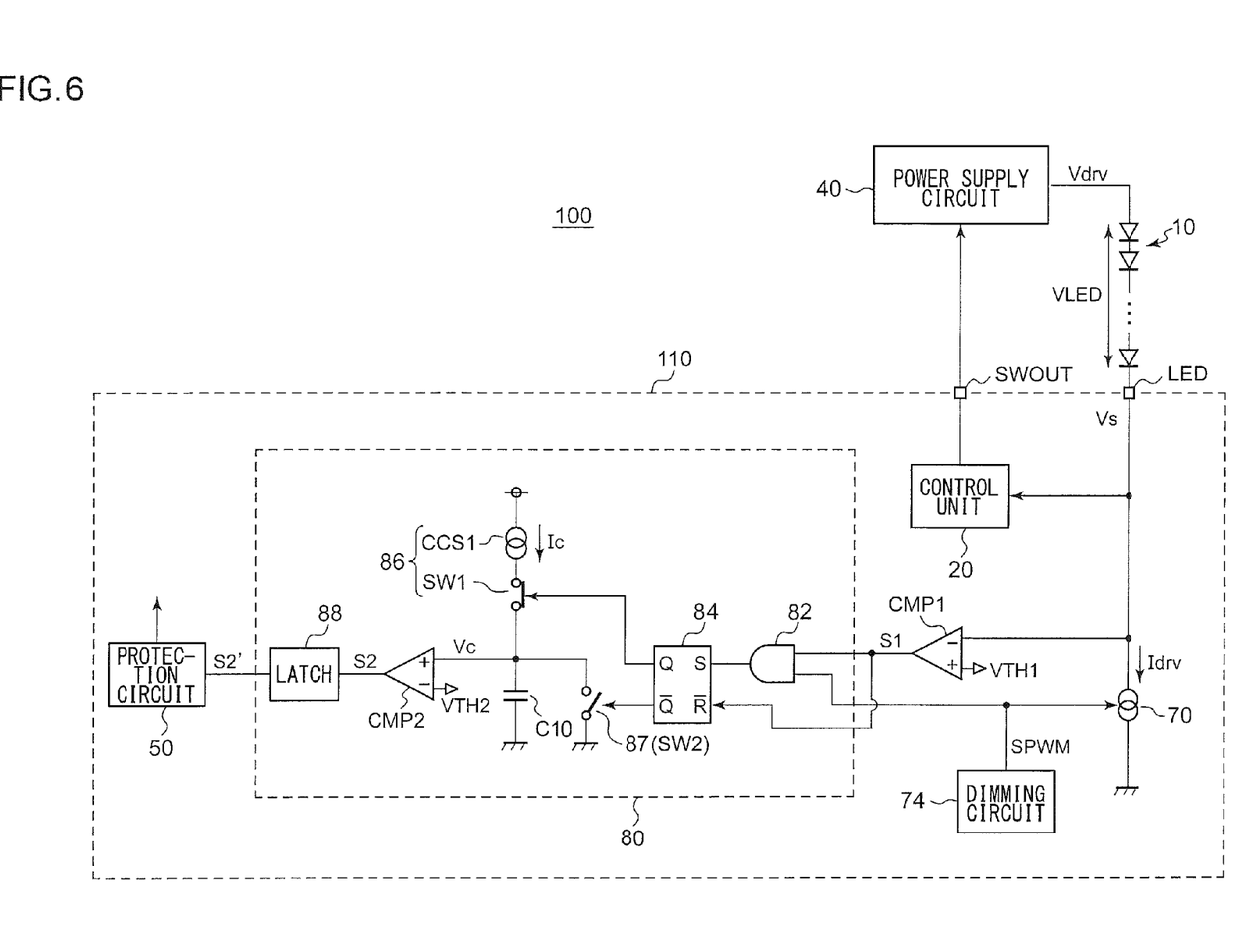
FIG. 6 is a circuit diagram which shows a configuration of an LED driving circuit according to a second embodiment.

FIG. 6 is a circuit diagram which shows a configuration of an LED driving circuit 100 according to a second embodiment. FIG. 6 shows the overall configuration of an light emitting apparatus including the LED driving circuit 100 and an LED string 10. Such a light emitting apparatus can be used for various applications employing LEDs, such as a backlight for a liquid crystal panel, illumination for a cellular phone, and an illumination apparatus. The second embodiment according to the present invention can be used in combination with the first embodiment, or can be used as a standalone apparatus.

The LED driving circuit 100 includes a power supply circuit 40 and an LED driving IC 110, and drives an LED string 10 including at least one LED. The power supply circuit 40 includes at least one of a switching regulator, a charge pump circuit, and a linear regulator, or a combination thereof. The power supply circuit 40 generates a driving voltage Vdrv required to drive the LED string 10, and supplies the driving voltage Vdrv thus generated to the anode of the LED string 10. The configuration of the power supply circuit 40 is not restricted in particular. Here, the power supply circuit 40 is taken to be a switching regulator. The power supply circuit 40 shown in FIG. 6 corresponds to the DC/DC converter 40 shown in FIG. 2.

The LED driving IC 110 has the following three principal functions.

(1) A function for adjusting the driving voltage Vdrv by performing a feedback control operation on the power supply circuit 40.
(2) A function for controlling the luminance level by adjusting the driving current Idrv that flows through the LED string 10.
(3) A function for detecting abnormal states, so as to protect the circuit.

Regarding the second function, the LED driving IC 110 includes a voltage. The voltage control unit 20 receives the electric potential at the LED terminal connected to the cathode of the LED string 10 (which will be referred to as the "detection voltage Vs" hereafter), and controls the power supply circuit 40 by means of a feedback operation such that the detection voltage Vs matches a predetermined reference voltage Vref. The feedback control operation allows the output voltage Vdrv of the power supply circuit 40 to be adjusted so as to satisfy the relation Vdrv=VLED+Vref. The voltage control unit 20 corresponds to the pulse modulator 20 shown in FIG. 2.

In a case in which the power supply circuit 40 is configured as a switching regulator, the voltage control unit 20 generates a PWM signal SWOUT having a duty ratio that corresponds to the difference between the reference voltage Vref and the detection voltage Vs, and supplies the PWM signal SWOUT thus generated to the power supply circuit 40. A switching element (not shown) included within the power supply circuit 40 repeatedly performs an ON/OFF operation according to the PWM signal SWOUT, thereby adjusting the driving voltage Vdrv.

Regarding the second function, the LED driving IC 110 includes a current driver (constant current circuit shown in FIG. 2) 70 and a PWM dimming circuit 74 (dimming circuit 74 shown in FIG. 2). The current driver 70 is arranged on the cathode side on a current path of the LED string 10 to be driven. The current driver 70 generates a driving current Idrv that corresponds to the luminance level, thereby controlling the current that flows through the LED string 10. The dimming adjustment operation for the luminance level of the LED string 10 according to the magnitude of the driving current Idrv will be referred to as "current dimming" (analog dimming).

The LED driving IC 110 performs a so-called PWM dimming operation, in addition to the current dimming operation. Specifically, the LED driving IC 110 performs a switching operation on the driving current with a duty ratio that corresponds to the luminance level in a time sharing manner so as to adjust the average time of the driving current Idrv, thereby changing the luminance level.

The PWM dimming circuit 74 generates a pulse-modulated driving pulse SPWM having a duty ratio that corresponds to the luminance level. The PWM dimming circuit 74 controls the current driver 70 according to the driving pulse SPWM, thereby turning on and off the driving current Idrv. In FIG. 6, the high level period of the driving pulse SPWM is assigned to the light emission period (ON period Ton) of the LED string 10, and the low level period is assigned to the non-light-emission period (Toff).

The LED driving IC 110 performs both the current dimming operation and the PWM dimming operation, thereby optimizing the luminance level of the LED string 10.

Next, description will be made regarding the third function, i.e., a circuit protection function. Regarding the circuit protection function, the LED driving IC 110 includes an abnormal state detection circuit CMP1, a timer latch circuit 80, and a protection circuit 50.

The abnormal state detection circuit CMP1 monitors the electric potential at the cathode terminal (LED terminal) of the LED string 10, i.e., the detection voltage Vs, and generates an abnormal state detection signal S1. Whenever the detection voltage Vs deviates from a predetermined range, the abnormal state detection circuit CMP1 judges that there is an abnormal state, and asserts the abnormal state detection signal 51. When the detection voltage Vs is within the predetermined range, the abnormal state detection signal S1 is negated.

The abnormal state detection circuit CMP1 may be configured as a comparator configured to compare the detection voltage Vs with a predetermined first threshold voltage VTH1, for example. In a case in which the abnormal state detection circuit CMP1 has a function for detecting if the circuit including the LED string 10 is in an open state, the first threshold voltage VTH1 is preferably set to be a value which is smaller than the reference voltage Vref and near to the ground voltage 0 V. In this case, when Vs<VTH1, the abnormal state detection circuit CMP1 judges that there is an abnormal state, and asserts the abnormal state detection signal S1 (switches the abnormal state detection signal S1 to the high level state).

When the driving pulse SPWM indicates ON, and the abnormal state detection signal S1 is asserted, the timer latch circuit 80 starts counting time. After the time counting begins, whenever a predetermined period of time T1 elapses before the abnormal state detection signal S1 is negated, the timer latch circuit 80 asserts a protection signal S2.

In order to provide such a function, the timer latch circuit 80 includes an AND gate 82, an SR flip-flop 84, a charging circuit 86, a discharging circuit 87, a first capacitor C10, a timer comparator CMP2, and a latch 88.

The first capacitor C10 is arranged such that the first terminal is grounded and set to a fixed potential. The charging circuit 86 is configured so as to allow the state to be switched between the activated state and the deactivated state. In the activated state, the charging circuit 86 supplies a constant current Ic to the first capacitor C10, thereby charging the first capacitor C10. For example, the charging circuit 86 includes a constant current source CCS1 configured to generate the constant current Ic and a charging switch arranged on a path of the charging current Ic. When the charging switch SW1 is on, the charging circuit 86 is in the activated state.

In the activated state, the discharging circuit 87 releases the current from the first capacitor C10, thereby discharging the first capacitor C10. The discharging circuit includes a discharging switch SW2 arranged between the second terminal of the first capacitor C10 and the ground terminal, for example. Whenever the discharging switch (SW2) is switched on, the discharging circuit 87 enters the activated state, which initializes the electric potential (capacitor voltage Vc) at the second terminal of the first capacitor to the ground electric potential (0 V).

The AND gate 82 generates the logical AND of the driving pulse SPWM and the abnormal state detection signal S1, and outputs the logical AND thus generated to the set terminal (S) of the SR flip-flop 84. Furthermore, the abnormal state detection signal S1 is input to the reset terminal (logical inverting input terminal) of the SR flip-flop 84.

That is to say, when the driving pulse SPWM indicates ON, and the abnormal state detection signal S1 is asserted, the SR flip-flop 84 is set. Furthermore, whenever the abnormal state detection signal S1 is negated, the SR flip-flop 84 is reset.

In the set state, the SR flip-flop 84 sets the charging circuit 86 to the activated state, and sets the discharging circuit 87 to the deactivated state. When the SR flip-flop 84 is in the set state, the first capacitor C10 is charged with the constant current Ic. Accordingly, the electric potential (capacitor voltage) Vc at the second terminal of the first capacitor C10 rises with time.

In the reset state, the SR flip-flop 84 sets the charging circuit 86 to the deactivated state, and sets the discharging circuit 87 to the activated state. When the discharging circuit 87 is set to the activated state, the capacitor voltage Vc is initialized.

The timer comparator CMP2 compares the capacitor voltage Vc with a predetermined second threshold voltage VTH2, and generates a protection signal S12 having a level that corresponds to the comparison result. When Vc>VTH2, the protection signal S12 is switched to the high level state (asserted). The capacitor voltage Vc is represented by the Expression Vc=t×Ic/C10. Here, t represents time elapsed from the start of the charging operation, and C10 represents the capacitance of the first capacitor C10.

Accordingly, after the passage of a predetermined period of time T1 represented by the following Expression after the start of the charging operation, the protection signal S12 is asserted.

$$T1 = VTH2 \times C10/Ic$$

The latch 88 latches the protection signal S12. The protection circuit 50 receives the protection signal S12' thus latched. Whenever the protection signal S12' is asserted, i.e., whenever an abnormal state continues for the predetermined period of time T1, the protection circuit 50 executes predetermined protection processing. Examples of such protection processing include shutting down the power supply circuit 40 or the current driver 70. However, such protection processing is not restricted in particular.

The above is the configuration of the LED driving circuit 100 shown in FIG. 6. Next, description will be made regarding the operation thereof.

Figure 7A:
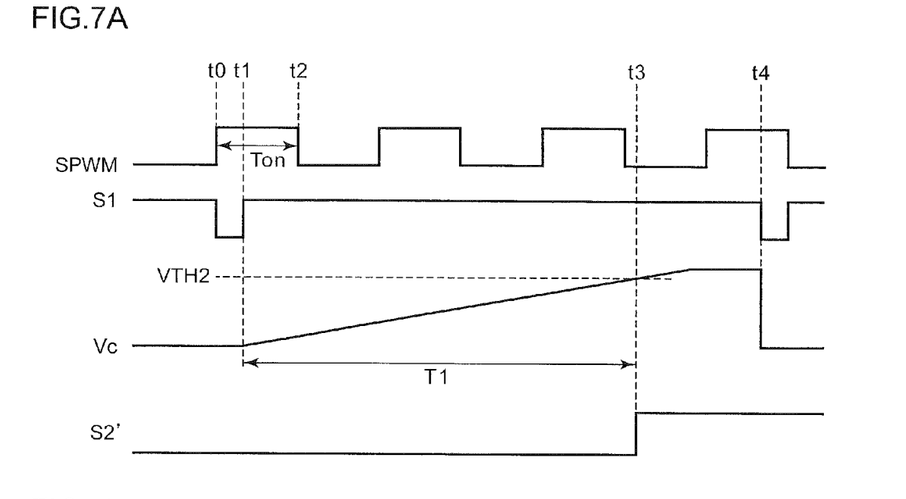
FIGS. 7A and 7B are time charts which each show an example of the operation of the LED driving circuit shown in FIG. 6.
Figure 7B:
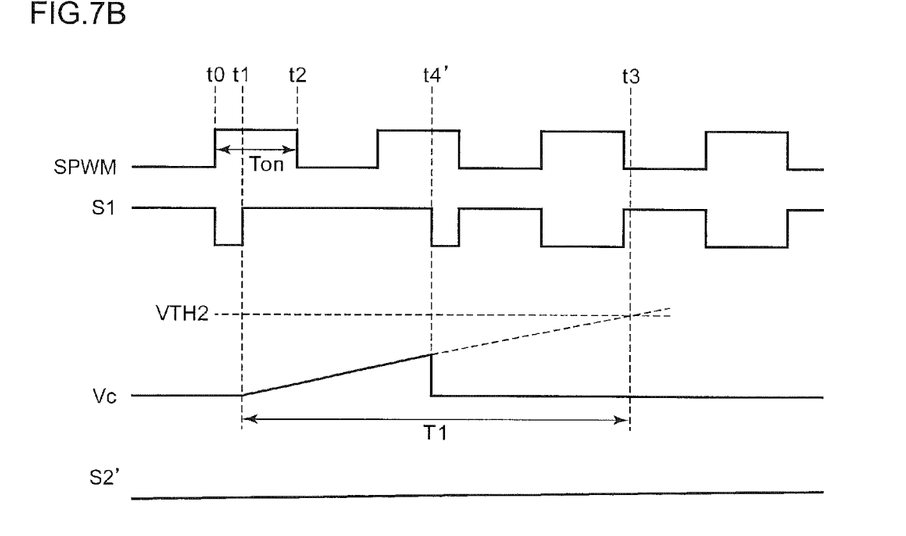

FIGS. 7A and 7B are time charts which each show an example of the operation of the LED driving circuit 100 shown in FIG. 6. FIGS. 7A and 7B each show the driving pulse SPWM, the abnormal state detection signal S1, the capacitor voltage Vc, and the protection signal S12, in this order, starting from the top.

FIG. 7A shows a sequence in a case in which the circuit protection operation is executed. At a given time point t0, the driving signal SPWM is switched to the high level state, thereby switching the LED string 10 to the ON state. In this state, whenever an open state occurs on a path of the LED string 10, the electric potential Vs at the LED terminal drops to around the ground voltage (0 V), thereby asserting the abnormal state detection signal S1 (switched to the high level state). Whenever the abnormal state detection signal S1 is asserted, the SR flip-flop 84 is set, thereby starting the charging operation for the first capacitor C10 by means of the charging circuit 86.

At the time point t2, the driving pulse SPWM is switched to the low level state. However, this does not affect the state of the SR flip-flop 84. That is to say, the charging circuit 86 continues the charging operation.

At the time point t3, the capacitor voltage Vc reaches the second threshold voltage VTH2. This means that the abnormal state has continued for the predetermined period of time t1 or more. At the time point t3, the protection signal S12 (S12') is asserted, thereby executing the protection processing.

Subsequently, when the abnormal state is resolved, and the abnormal state detection signal S1 is negated at the time point t4, the SR flip-flop 84 is reset, and the discharging circuit 87 initializes the capacitor voltage Vc.

FIG. 7B shows a sequence in a case in which the circuit protection operation is not executed. The same sequence as shown in FIG. 7A is executed until the time point t3. In FIG. 7B, at the time point t4' before the predetermined period of time T1 elapses from the start of the charging operation, the abnormal state detection signal S1 is negated. Accordingly, the capacitor voltage Vc does not reach the second threshold voltage VTH2. In this case, the protection signal S12 (S12') is not asserted, and accordingly, the protection signal is not executed.

As described above, with the LED driving circuit 100 according to the embodiment, in a case in which an abnormal state occurs in the ON period Ton, and the abnormal state continues for the predetermined period of time T1 or more, the protection processing is performed. Even if the driving pulse SPWM is switched to the OFF state during the abnormal state, the detection of the abnormal state is not canceled. Thus, such an arrangement is capable of protecting the circuit without being affected by the change in the pulse width of the driving pulse SPWM even if the pulse width of the driving pulse SPWM is changed.

As a comparison technique, let us consider an arrangement in which the SR flip-flop 84 is eliminated, and the states of the charging circuit 86 and the discharging circuit 87 are each directly switched between the activated state and the deactivated state according to the output signal of the AND gate 82. That is to say, in a period of time in which the LED string 10 is in the ON state (light-emitting state) and the abnormal state detection signal S1 is asserted, the charging circuit 86 is set to the activated state.

With such a comparison technique, whenever the driving pulse SPWM is switched to the low level state immediately after the abnormal state detection signal S1 is asserted, the charging circuit 86 is set to the deactivated state, which stops the time counting, even though the abnormal state continues. That is to say, in some cases, the protection signal S12 is not asserted, and the protection processing is not performed even if an abnormal state continues for the predetermined period of time T1.

In contrast, with the LED driving circuit 100 according to the embodiment, the circuit protection operation can be performed without involving the pulse width (length of the ON period Ton) of the driving pulse SPWM.

While the preferred embodiments of the present invention have been described using specific terms, such description is for illustrative purposes only, and it is to be understood that changes and variations may be made without departing from the spirit or scope of the appended claims.

What is claimed is:

1. A driving circuit comprising:
a pulse modulator configured to generate a first pulse signal the duty ratio of which is adjusted such that a detection voltage which indicates the electrical state of a light emitting diode to be driven matches a predetermined reference voltage;
a pulse transformer including a primary coil and a secondary coil, and arranged such that the first pulse signal is applied to the primary coil;
a switching regulator including a switching element, wherein an ON/OFF operation of which is controlled according to a signal that originates at the secondary coil of the pulse transformer, and configured to stabilize an input voltage, and to output the input voltage thus stabilized to a first terminal of the light emitting diode; and
a constant current circuit connected to a second terminal of the light emitting diode,
wherein the pulse modulator adjusts the duty ratio of the first pulse signal such that the electric potential at the second terminal matches the predetermined voltage,
and wherein the light emitting diode is a backlight of a liquid crystal display,
and wherein the driving circuit further comprises:
  a PLL circuit configured to receive a vertical synchronization signal which is synchronized with the image data to be displayed on the liquid crystal display, and to multiply the vertical synchronization signal so as to generate a clock signal; and
  a duty ratio setting unit configured to count the clock signal so as to generate a pulse-modulated pulse modulation signal,
and wherein the constant current circuit switches on and off a driving current that flows through the light emitting diode, according to the pulse modulation signal.

2. A driving circuit according to claim 1, further comprising:
a smoothing circuit configured to smooth an AC voltage; and
a power factor correction circuit configured to receive the voltage thus smoothed by the smoothing circuit, and to generate an input voltage of the switching regulator.

3. A driving circuit for a light emitting diode according to claim 1, further comprising:
a pulse modulation dimming circuit configured to generate a pulse-modulated driving pulse, and to switch on and off a driving current generated by the constant current circuit according to the driving pulse;
an abnormal state detection circuit configured to monitor the electric potential at the second terminal of the light emitting diode, and to generate an abnormal state detection signal which is asserted when an abnormal state is detected;
a timer circuit configured to start counting time when the driving pulse indicates ON and the abnormal state detection signal is asserted, and to generate a protection signal which is asserted whenever a predetermined period of time elapses before the abnormal state detection signal is negated,
wherein, when the protection signal is asserted, predetermined protection processing is executed.

4. A light-emitting apparatus comprising:
a light emitting diode; and
a driving circuit according to claim 1, configured to drive the light emitting diode.

5. A display apparatus comprising:
a liquid crystal panel; and
a light-emitting apparatus according to claim 4, arranged as a backlight mounted on a back face of the liquid crystal panel.

6. A driving circuit comprising:
a pulse modulator configured to generate a first pulse signal the duty ratio of which is adjusted such that a detection voltage which indicates the electrical state of a light emitting diode to be driven matches a predetermined reference voltage;
a pulse transformer including a primary coil and a secondary coil, and arranged such that the first pulse signal is applied to the primary coil;
a switching regulator including a switching element, wherein an ON/OFF operation of which is controlled according to a signal that originates at the secondary coil of the pulse transformer, and configured to stabilize an input voltage, and to output the input voltage thus stabilized to a first terminal of the light emitting diode; and
a constant current circuit connected to a second terminal of the light emitting diode,
wherein the pulse modulator adjusts the duty ratio of the first pulse signal such that the electric potential at the second terminal matches the predetermined voltage, and wherein the timer circuit comprises:
a capacitor arranged such that the electric potential at one terminal is fixed;
a charging circuit configured to charge the capacitor;
a discharging circuit configured to discharge the capacitor;
a flip-flop configured to be set when the driving pulse indicates ON and the abnormal state detection signal is asserted, and to be reset when the abnormal state detection signal is negated, and, when it is in the set state, to activate the charging circuit and deactivate the discharging circuit, and, when it is in the reset state, to deactivate the charging circuit and activate the discharging circuit; and
a comparator configured to compare the electric potential at the other terminal of the capacitor with a predetermined threshold voltage, and to generate a protection signal having a level that corresponds to the comparison result.

7. A driving circuit for a light emitting diode comprising:
a current driver arranged on a cathode side of a current path of the light emitting diode to be driven, and configured to generate a driving current;
a pulse modulation dimming circuit configured to generate a pulse-modulated driving pulse, and to switch on and off the driving current according to the driving pulse thus generated;
an abnormal state detection circuit configured to monitor the electric potential at the cathode terminal of the light emitting diode, and to generate an abnormal state detection signal which is asserted when an abnormal state is detected; and
a timer circuit configured to receive the driving pulse and the abnormal state detection signal and to start time counting when the driving pulse indicates ON and the abnormal state detection signal is asserted, and to generate a protection signal which is asserted whenever a predetermined period of time elapses before the abnormal state detection signal is negated, wherein, when the protection signal is asserted, predetermined protection processing is executed, and wherein the timer circuit comprises:

a capacitor arranged such that the electric potential at one terminal is fixed;

a charging circuit configured to charge the capacitor;

a discharging circuit configured to discharge the capacitor;

a flip-flop configured to be set when the driving pulse indicates ON and the abnormal state detection signal is asserted, and to be reset when the abnormal state detection signal is negated, and, when it is in the set state, to activate the charging circuit and deactivate the discharging circuit, and, when it is in the reset state, to deactivate the charging circuit and activate the discharging circuit; and a comparator configured to compare the electric potential at the other terminal of the capacitor with a predetermined threshold voltage, and to generate a protection signal having a level that corresponds to the comparison result.

8. A light-emitting apparatus comprising:

a light emitting diode; and a driving circuit according to claim 7, configured to drive the light emitting diode.

* * * * *